US007191089B2

(12) United States Patent
Clifford et al.

(10) Patent No.: US 7,191,089 B2
(45) Date of Patent: Mar. 13, 2007

(54) SYSTEM AND METHOD FOR FALL DETECTION

(75) Inventors: Michelle A. Clifford, Chandler, AZ (US); Rodrigo L. Borras, Marshalltown, IA (US); Leticia Gomez, San Diego, CA (US); Akihiro Ueda, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 11/001,957

(22) Filed: Dec. 1, 2004

(65) Prior Publication Data

US 2006/0116848 A1 Jun. 1, 2006

(51) Int. Cl.
*G01P 15/00* (2006.01)
(52) U.S. Cl. ..................................... 702/141
(58) Field of Classification Search .................. 702/141
See application file for complete search history.

(56) References Cited

U.S. PATENT DOCUMENTS

| 4,745,564 | A | 5/1988 | Tennes et al. | |
|---|---|---|---|---|
| RE35,269 | E | 6/1996 | Comerford | |
| 5,835,298 | A * | 11/1998 | Edgerton et al. | 360/75 |
| 5,982,572 | A | 11/1999 | Dahlerud | |
| 6,101,062 | A | 8/2000 | Jen et al. | |
| 6,570,726 | B2 | 5/2003 | Mutoh | |
| 6,612,157 | B2 | 9/2003 | Urano | |
| 6,771,449 | B1 | 8/2004 | Ito et al. | |
| 2002/0118121 | A1* | 8/2002 | Lehrman et al. | 340/870.16 |
| 2006/0070439 | A1* | 4/2006 | Kwon et al. | 73/488 |

* cited by examiner

*Primary Examiner*—John Barlow
*Assistant Examiner*—Cindy D. Khuu
(74) *Attorney, Agent, or Firm*—Ingrassia, Fisher & Lorenz

(57) ABSTRACT

A system and method is provided for electronic device fall detection. The system and method provides the ability to reliably detect falls even in the presence of other motion in the electronic device. The fall detection system includes a plurality of accelerometers and a processor. The plurality of accelerometers provides acceleration measurements to the processor, with these measurements describing the current acceleration of the electronic device in all directions. The processor receives the acceleration measurements and compares the acceleration measurements to a value range to determine if the device is currently falling. Furthermore, the system and method can reliably detect a non-linear fall, such as when the fall is accompanied with device rotation or initiated by additional external force. To detect a non-linear fall, the processor compares combinations of acceleration measurements to a value range and further determines the smoothness of the acceleration measurement combinations.

20 Claims, 7 Drawing Sheets

SYSTEM AND METHOD FOR FALL DETECTION

FIELD OF THE INVENTION

This invention generally relates to fall detection in electronic devices.

BACKGROUND OF THE INVENTION

Sophisticated electronic devices are becoming more and more commonplace. These electronic devices include computing devices such as notebook/portable computers and personal digital assistants (PDAs), communication devices such as wireless telephones, and media devices such as CD, DVD and MP3 players. These and other electronic devices commonly include a variety of sensitive components. One issue with these electronic devices is their ability to withstand physical impacts to the system. One common source of impacts are falls, either inadvertent or intentional. Portable devices are commonly carried, and thus are commonly dropped. The force of the resulting impact can damage sensitive portions of the device.

Some electronic devices are capable of better withstanding an impact if put into a protective mode. For example, with devices that include hard drives, the hard drives can better withstand the shock of an impact if the drive is parked. In these types of devices, it is beneficial to detect when a fall is occurring such that protective action can be taken to reduce the potential negative results of the impact such as a loss of data or damage caused to the disk.

Unfortunately, prior methods for detecting a fall have had limited success. For example, some methods have relied upon complex angular velocity calculations, and are not applicable to devices without spinning disks. Other methods have been limited in their ability to detect falls that are accompanied with other motions.

Thus, what is needed is an improved system and method for detecting a fall in an electronic device that provides fall detection in reliable and efficient manner.

BRIEF SUMMARY OF THE INVENTION

The present invention provides a system and method for fall detection in an electronic device. The system and method provides the ability to reliably detect falls even in the presence of other motion in the electronic device. The fall detection system includes a plurality of accelerometers and a processor. The plurality of accelerometers provides acceleration measurements to the processor, with these measurements describing the current acceleration of the electronic device in all directions.

The processor receives the acceleration measurements and compares the acceleration measurements to a value range to determine if the device is currently falling. Furthermore, the system and method can reliably detect a non-linear fall, such as when the fall is accompanied with device rotation or initiated by additional external force. To detect a non-linear fall, the processor compares combinations of acceleration measurements to a value range and further determines the smoothness of the acceleration measurement combinations. If the acceleration measurement combinations are within the value range and are smooth, then a non-linear fall is occurring.

When a fall is detected, the processor provides a fall detection signal to the electronic device. The electronic device can then take appropriate action to reduce the potential negative results of the impending impact. For example, the electronic device can suspend operation and/or save sensitive data, thus preventing data loss during a fall when it write mode. The system and method is thus able to provide reliable fall detection for electronic devices, and can thus be used to improve the robustness of the device.

In a further variation, the system and method can be used to determine the height of a fall. Specifically, by calculating the time from beginning of fall to impact, the system and method can calculate the height dropped. This information can be stored in the device for later use, such as to determine if the device robustness was within specifications.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a system and method for fall detection in an electronic device. The system and method provides the ability to reliably detect falls even in the presence of other motion in the electronic device.

Figure 1:
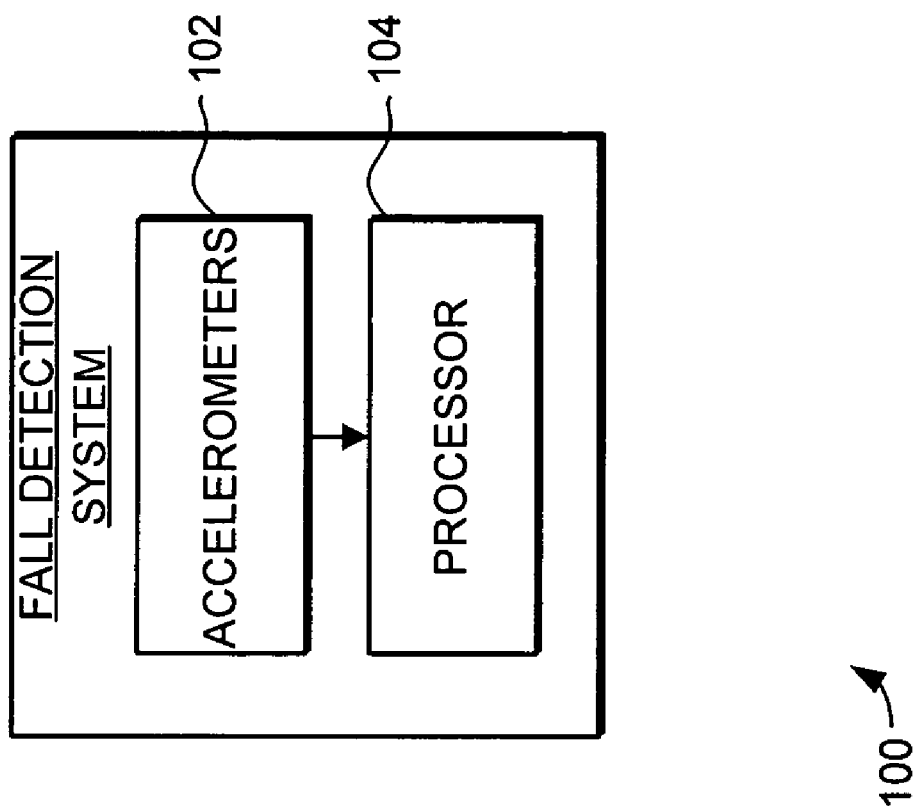
FIG. 1 is a schematic view of an fall detection system in accordance with a first embodiment of the invention.

Turning now to FIG. 1, a fall detection system 100 is illustrated schematically. The fall detection system 100 includes a plurality of accelerometers 102 and a processor 104. The plurality of accelerometers 102 provides acceleration measurements to the processor 104, with these measurements describing the current acceleration of the electronic device in all directions.

To provide fall detection the accelerometers 102 are configured on the electronic device where they can sense the acceleration of the electronic device. The processor 104 receives the acceleration measurements and compares the acceleration measurements to a value range to determine if the device is currently falling. Furthermore, the system 100 can reliably detect a non-linear fall, such as when the device fall is accompanied with device rotation or is initiated by additional external force. To detect a non-linear fall, the processor 104 compares combinations of acceleration measurements to a value range and further determines the smoothness of the acceleration measurement combinations. If the acceleration measurement combinations are within the value range and are smooth, then a non-linear fall is occurring.

When a fall is detected, the processor 104 provides a fall detection signal to the electronic device. The electronic device can then take appropriate action to reduce the potential negative results of the impending impact. For example, the electronic device can suspend operation and/or save sensitive data. The fall detection system 100 is thus able to provide reliable fall detection for electronic devices, and can thus be used to improve the robustness of the device.

In a further variation, the fall detection system 100 can be used to determine the height of a fall. Specifically, by calculating the time from beginning of fall to impact, the system 100 can calculate the height dropped. This information can be stored in the device for later use, such as to determine if the device robustness was within specifications. In addition, this fall information can be used for warranty purposes identifying potential issues with the product (e.g., repeated fall failure) as well as gathering information on consumer usability and product handling.

The present invention can be used to detect falls in a wide variety of different types of electronic devices. For example, it can be used to detect falls in portable computing devices such as PDA's and laptops. It can also be used to detect falls in media players such as CD/DVD players and MP3 players. It can also be used to detect falls in communication devices, such as wireless telephones, pagers or other wireless communication devices. It can also be used in imaging devices such as still and video cameras. In all these and other electronic devices the present invention can be adapted to detect a fall and provide a warning signal to the device.

A variety of different types of accelerometers can be used in the system and method. One specific type of accelerometer that can be used is a micromachined accelerometer. For example, micromachined accelerometers can be used to accurately measure acceleration using changes in capacitance. Capacitive micromachined accelerometers offer high sensitivity with low noise and low power consumption and thus are ideal for many applications. These accelerometers typically use surface micromachined capacitive sensing cells formed from semiconductor materials. Each cell includes two back-to-back capacitors with a center plate between the two outer plates. The center plate moves slightly in response to acceleration that is perpendicular to the plates. The movement of the center plate cause the distance between the plates to change. Because capacitance is proportional to the distance between plates, this change in distance between plates changes the capacitance of the two capacitors. This change in capacitance of the two capacitors is measured and used to determine the acceleration in the direction perpendicular to the plates, where the direction perpendicular to the plates is commonly referred to as the axis of the accelerometer.

Typically micromachined accelerometers are packaged together with an ASIC that measures the capacitance, extracts the acceleration data from the difference between the two capacitors in the cell, and provides a signal that is proportional to the acceleration. In some implementations more than one accelerometer will be combined together in one package. For example, some implementations include three accelerometers, with each accelerometer is configure to measure acceleration in a different orthogonal axis. The three accelerometers are designed or packaged together with the ASIC used to measure and provide the acceleration signals for all three directions. Other implementations are packaged with one accelerometer per device or two accelerometers per device. All of these implementations can be adapted for use in the fall detection system and method.

One suitable accelerometer that can be adapted for use in the system and method is a triple-axis accelerometer MMA7260Q available for Freescale Semiconductor, Inc. This accelerometer provides the advantage of measuring acceleration in all three directions with a single package. Other suitable accelerometers include dual axis accelerometer MMA6260Q and single axis accelerometer MMA1260D. Other types of accelerometers that can be used include a combination of MMA6161Q, MMA6262Q, MMA6263Q, MMA2260D with the MMA1260D or by mounting a device on its side to achieve 3 axis sensing. Of course, these are just some examples of the type of accelerometers that can be used in the fall detection system and method.

Figure 2:
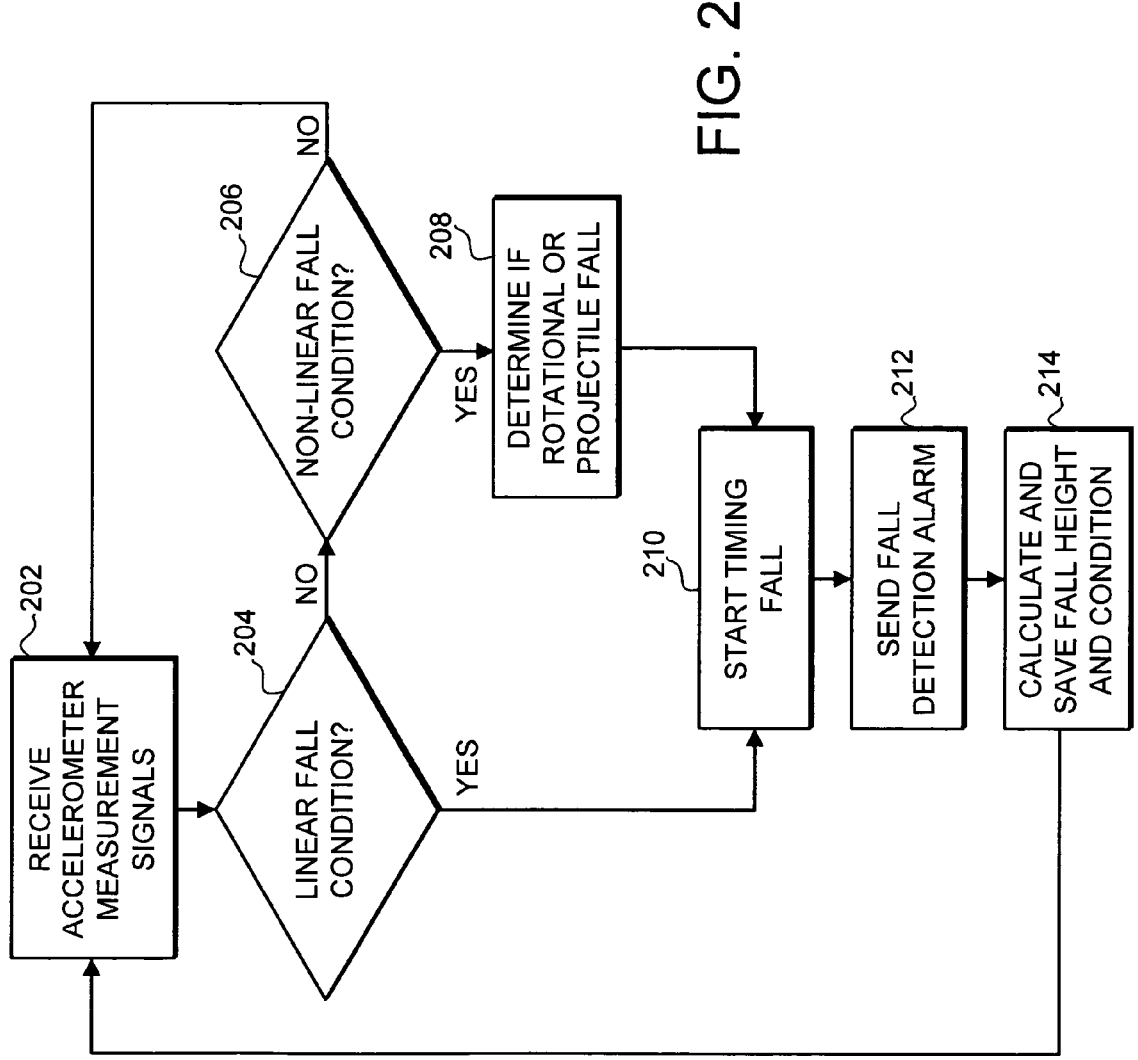
FIG. 2 is a flow diagram of a fall detection method in accordance with an embodiment of the invention.

Turning now to FIG. 2, a method 200 of fall detection is illustrated. The method 200 provides the ability to detect freefall in an electronic device. The method 200 tests for both linear fall conditions and non-linear fall conditions. In general, a linear fall condition is one where the electronic device freely falls without other significant movement or force applied. Conversely, a non-linear fall condition is one where the fall occurs with significant rotation of the device, or where the fall is accompanied with additional external force, such as where the device is thrown. Detecting non-linear fall condition is generally more complex due to the other actions operating on the device during the fall. Thus, method 200 first examines for linear fall conditions before examining for non-linear fall conditions.

The first step 202 is to receive accelerometer measurement signals. Typically the accelerometer measurement signals are provided by at least three accelerometers, where the at least three accelerometers are configured to measure acceleration in three orthogonal axes. Thus, there is at least one accelerometer measuring acceleration in an X axis, at least one accelerometer measuring acceleration in a Y axis, and at least one accelerometer measuring acceleration in a Z axis, where X, Y and Z are orthogonal axes. Of course different arrangements of accelerometers could be used in some embodiments.

With the accelerometer measurement signals received, the next step 204 is to determine if a linear fall condition is occurring. As will be described in greater detail below one method of determining if a linear fall is occurring is to compare the measurement signals to a value range. If the measurement signals for each axis are each within a specified value range for a specified number of measurements, then a linear fall is determined to be occurring.

When a linear fall is determined to be occurring in step 204, the next step 210 is to start timing the fall. The timing of the fall will be used to determine the fall height. The next step 212 is to send a fall detection alarm to the electronic device. The electronic device can then take appropriate action to reduce the potential negative results of the impending impact. For example, the electronic device can suspend operation and/or save sensitive data.

When a linear fall is not occurring in step 204, the next step 206 is to determine if a non-linear fall condition is occurring. As will be described in greater detail below, one method of determining if a non-linear fall is occurring is to compare combinations of acceleration measurements to a value range and to determine the smoothness of the acceleration measurement combinations. If the acceleration measurement combinations are within the value range and are smooth, then a non-linear fall condition is occurring. As will be described below, one exemplary combination of measurements that can be used is a sum of the squares of the measurements.

When a non-linear fall is occurring, the next step 208 is determined if the fall is a rotational fall or a projectile fall. This step can be accomplished by determining if the fall was initiated by additional external force. For example, the system and method can be adapted to determine if the falls was the result of being thrown. To determine if the fall was initiated by external force, the previously sampled data points that were read before the fall are analyzed to determine if the device experienced high accelerations in one direction. When such acceleration was present in the predetermined time period before the fall it can be assumed that the fall was initiated by external force, e.g., was thrown.

With the type of non-linear fall determined, the next step 210 is to start timing the fall, and the next step 212 is to send a fall detection alarm to the electronic device. The electronic device can again take appropriate action to reduce the potential negative results of the impending impact.

After sending a fall detection alarm to the electronic device, either in response to a linear fall or non-linear fall condition, the next step 214 is to calculate and save the fall height. The fall height can be calculated by determining the time from beginning of fall, as was determined in step 210, to the impact. The time of the impact is sensed when the acceleration measurements are no longer within the value range. Thus, the time period in which the acceleration measurements are in the value range corresponds to the time period of the fall. This information about the fall can be stored in the device for later use, such as to determine if the device robustness was within specifications. For example, stored fall information can be used to determine if an electronic device returned by a user was subjected to any falls while in the user's possession.

The method then returns to step 202 where more accelerometer output signals are received. The method continues to receive accelerometer measurement signals and evaluate for linear and non-linear fall conditions. Thus, the method is constantly receiving data and evaluating that data to determine if a fall is occurring. It should be noted that the steps in method 200 are merely exemplary, and that other combinations of steps or orders of steps can be used to provide fall detection.

Figure 3:
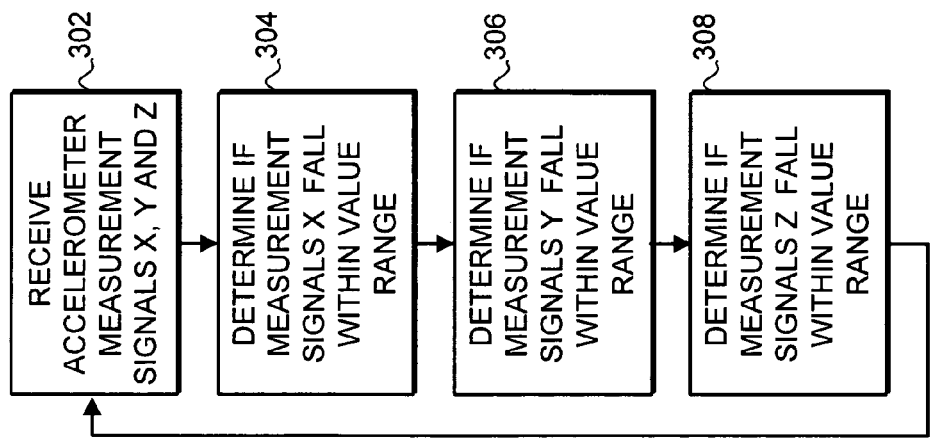
FIG. 3 is a flow diagram of a linear-fall detection method in accordance with an embodiment of the invention.

Turning now to FIG. 3, a method 300 for determining a linear-fall condition is illustrated. The method 300 can be used to implement step 204 in method 200. The method 300 is based on the observation that a linear falling object will have acceleration measurements in all directions go toward a value that corresponds to zero g acceleration. Thus, the method 300 compares measurements from each accelerometer to a selected value range, with the value range defining a set of acceleration values around zero g. The value range used would depend on a variety of factors. Typically, the larger the value range, the more likely a fall will be detected when it occurs. However, a larger value range will also increase the likelihood that non-fall conditions are erroneously determined to be falls. These erroneous fall predictions can be problematic if the performance cost of the device going into a protective mode is relatively high compared to its benefits. Thus, selecting a value range would typically depend upon relative costs of erroneous fall predictions with the benefits of detecting actual falls. It should be noted that because this method compares the acceleration to a value range around zero g that some relatively low-end accelerometers with low effective measurement ranges can be used to provide the acceleration measurements and that expensive calibration can also be avoided.

The first step 302 is to receive accelerometer measurement signals x, y and z, with the signals corresponding to measurements in X, Y and Z orthogonal axes. The format of the measurement signals would typically depend on the accelerometer used and how the output of the accelerometer is processed. Typical accelerometers provide a voltage that is proportional to the acceleration as an output. This output voltage can then be converted to a digital representation using an appropriate analog-to-digital converter. The conversion can be done by the processor, by the ASIC associated with accelerometers, or with separate converters. The number of bits used to represent the output would typically depend on a variety of factors, such as the desired resolution and the cost of components. As one example, an 8-bit solution can be used that would provide a range of 256 possible acceleration values, with a value of 128 corresponding to zero g. Additionally, the rate at which the analog-to-digital conversion is performed would depend upon the speed of the various components. For example, a typical suitable converter would provide digital values from the analog signals at a rate of 200 Hz.

The next step 304 is to determine if measurement signals x fall within a value range. As stated above, the value range defines a margin of acceleration values around zero g. One exemplary value range is to select a range that covers within +/−4 percent of zero g. In an 8 bit solution, this would correspond to acceleration values of within +/−5 bits of 128. Of course, this is just one example of a value range that can be used.

The next step 306 is likewise to determine if measurement signals y fall within the value range, and the next step 308 is to determine if the measurements signals z fall within the value range.

Typically, steps 304, 306 and 308 would be implemented such that a linear fall condition is detected only when measurement signals x, y and z are determined to be within the value range for a selected period of time. Requiring that each signal x, y and z be in the value range for a predetermined time period reduces the probability that random movements that result in near zero g measurement signals will be misinterpreted as indicative of a fall condition. As one example, steps 304, 306 and 308 can be implemented such that the signals are determined to fall within the value range when the signals are within the value range for at least $\frac{1}{20}$ of a second. In a system where digital measurement signals are provided at 200 Hz, a fall condition would thus be determined when ten consecutive measurements are within the value range for each axis simultaneously. Such an implementation facilitates relatively fast fall detection while reducing the likelihood of erroneous fall detections.

Steps 302–308 of method 300 would be performed in a real time basis, with the processor constantly receiving measurement signals and determining if the past sets of measurement signals have been within the value range for a predetermined time period. This can be accomplished by constantly loading the measurements into an appropriate FIFO buffer and evaluating the contents of the buffer to determine if the criteria are met for each set of measurement signals, and the loading the next set of measurements and removing the oldest set of measurements.

Figure 4:
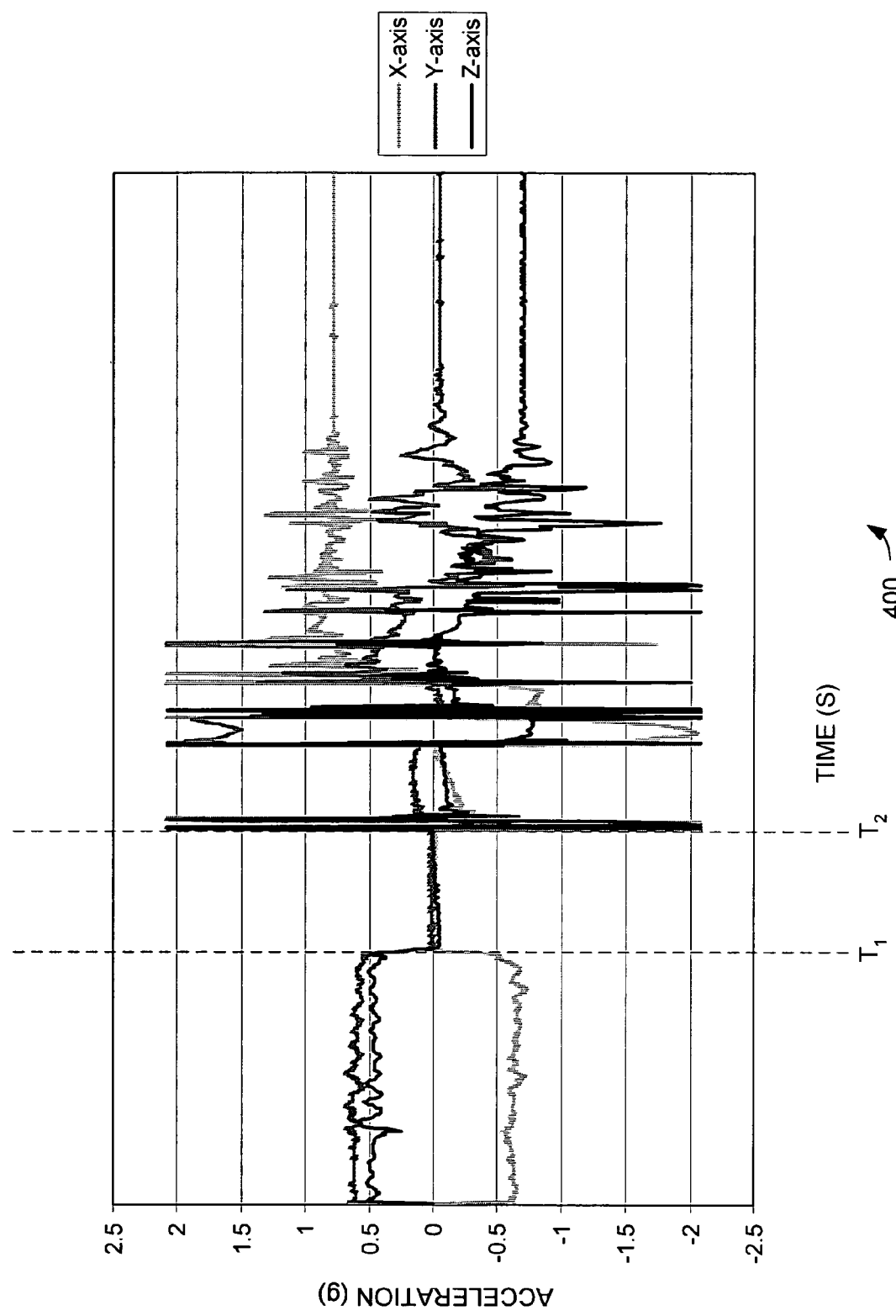
FIG. 4 is a graph of exemplary acceleration measurements during linear fall conditions in accordance with an embodiment of the invention.

Turning now to FIG. 4, a graph 400 illustrates exemplary accelerometer measurement signals x, y and z taken over a time period during which a fall occurs. The graph 400 illustrates a fall condition that occurs at time $T_1$. As illustrated in graph 400, at time $T_1$ the measurement signals x, y and z all are go to within a value range of zero g. Thus, a linear fall condition is detected when the signals x, y and z are simultaneously within the value range for a predetermined time period. At time $T_2$, the signals leave the value range, thus indicating the resulting impact. The amount of time between $T_1$ and $T_2$ is the approximate fall time. This fall time can be used to calculate the fall distance. Specifically, the fall distance will be approximately equal to the total number of time segments that the device is in freefall multiplied by the seconds per time segment, also known as the sample time. For the 200 Hz example, this multiplication factor would be 60/200=0.3 seconds per time segment.

Figure 5:
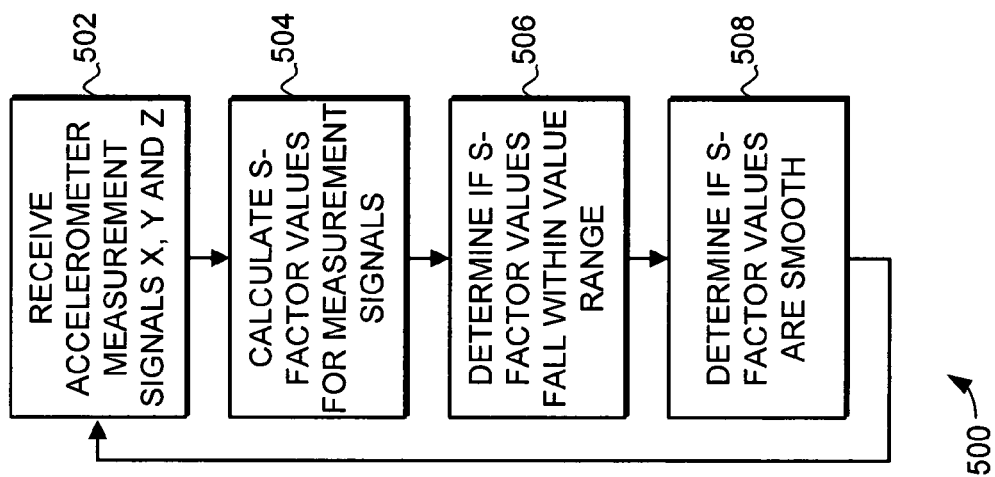
FIG. 5 is a flow diagram of a non-linear-fall detection method in accordance with an embodiment of the invention.

Turning now to FIG. 5, a method 500 for determining a non-linear-fall condition is illustrated. The method 500 can be used to implement step 206 in method 200. The method 500 is based on the observation that a non-linear falling object will have certain combinations of acceleration measurements go toward a value that corresponds to zero g acceleration and will be smooth. Thus, the method 500 compares combinations of measurements from each accelerometer to a selected value range, with the value range defining a combination of acceleration values around zero g. The method 500 then determines the smoothness of the combination of acceleration values, generally referred to herein as $S_{factor}$ values, and determines if they are smooth. Again, the parameters used would depend on a variety of factors, including the performance cost possible erroneous detections.

The first step 502 is to receive accelerometer measurement signals x, y and z, with the signals corresponding to measurements in X, Y and Z orthogonal axes. Again, the format of the measurement signals would typically depend on the accelerometer used and how the output of the accelerometer is processed. For example, an 8-bit solution can again be used that provides digital measurement values at a rate of 200 Hz.

The next step 504 is to calculate the $S_{factor}$ values from the measurement signals. In general, the $S_{factor}$ is defined and calculated to provide a combination of measurement values that is a good indication of non-linear falling, such as whether the device is static or to what degree external influence is acting upon it. A variety of types of combinations can be used. One exemplary $S_{factor}$ combination can be defined as:

$$S_{Factor} = x^2 + y^2 + z^2 \quad (1.)$$

where x, y and z are the acceleration measurement signals. In equation 1, the $S_{factor}$ combination is defined as the sum of the squares of the measurement signals, where the measurement signals are in g's (e.g., x=(x1−xoffset)÷sensitivity). Of course, other equations and calculations can be used to define and calculate the $S_{factor}$. Thus, step 504 calculates a combination of measurement values called $S_{factor}$ values that are can be used to determine if non-linear fall conditions exist or to what degree external influence is acting upon it.

The next step 506 is to determine if the combinations of measurement signals $S_{factor}$ are within a specified value range. Again, the value range defines a margin of $S_{factor}$ values around zero g. One exemplary value range is to select a range that covers within +/−3 to 12 percent of zero g. In an exemplary 8-bit solution, this would correspond to $S_{factor}$ values of within +/−2 to 7 bits of 128. Of course, this is just one example of a value range that can be used.

The next step 508 is to determine if the combination of measurement signals $S_{factor}$ are smooth. The smoothness of the $S_{factor}$ values can be calculated by determining the amount of change between consecutive $S_{factor}$ values and comparing the amount of change to a threshold delta value. The threshold delta value used would again depend on a variety of factors. In an 8 bit solution, the threshold delta value can be +/−2 to 7 bits. Thus, if consecutive $S_{factor}$ values are within +/−2 to 7 bits then the $S_{factor}$ is smooth at that time.

Typically, steps 506 and 508 would be implemented such that a non-linear fall condition is detected only when the $S_{factor}$ values are determined to be within the value range and smooth for a selected period of time. Requiring the $S_{factor}$ values to be in the value range and smooth for a predetermined time period reduces the probability that random movements will be misinterpreted as indicative of a non-linear fall condition. As one example, steps 506 and 508 can be implemented such that the $S_{factor}$ values are determined to be indicative of a non-linear fall when they are within the value range and be smooth for at least 50 to 150 milliseconds. In a system where digital measurement signals are provide at 200 Hz, a non-linear fall condition would thus be determined when ten consecutive measurements result in $S_{factor}$ values that are within the value range and are smooth. Such an implementation facilitates relatively fast fall detection while reducing the likelihood of erroneous fall detections.

Steps 502–508 of method 500 would be performed in a real time basis, with the processor constantly receiving measurement signals and determining if the past sets of measurement signals have $S_{factor}$ values that are within the value range and smooth. This can be accomplished by constantly loading the measurements into an appropriate FIFO buffer and evaluating the contents of the buffer to determine if the criteria are met for resulting $S_{factor}$ values, and then loading the next set of measurements and removing the oldest set of measurements.

Figure 6:
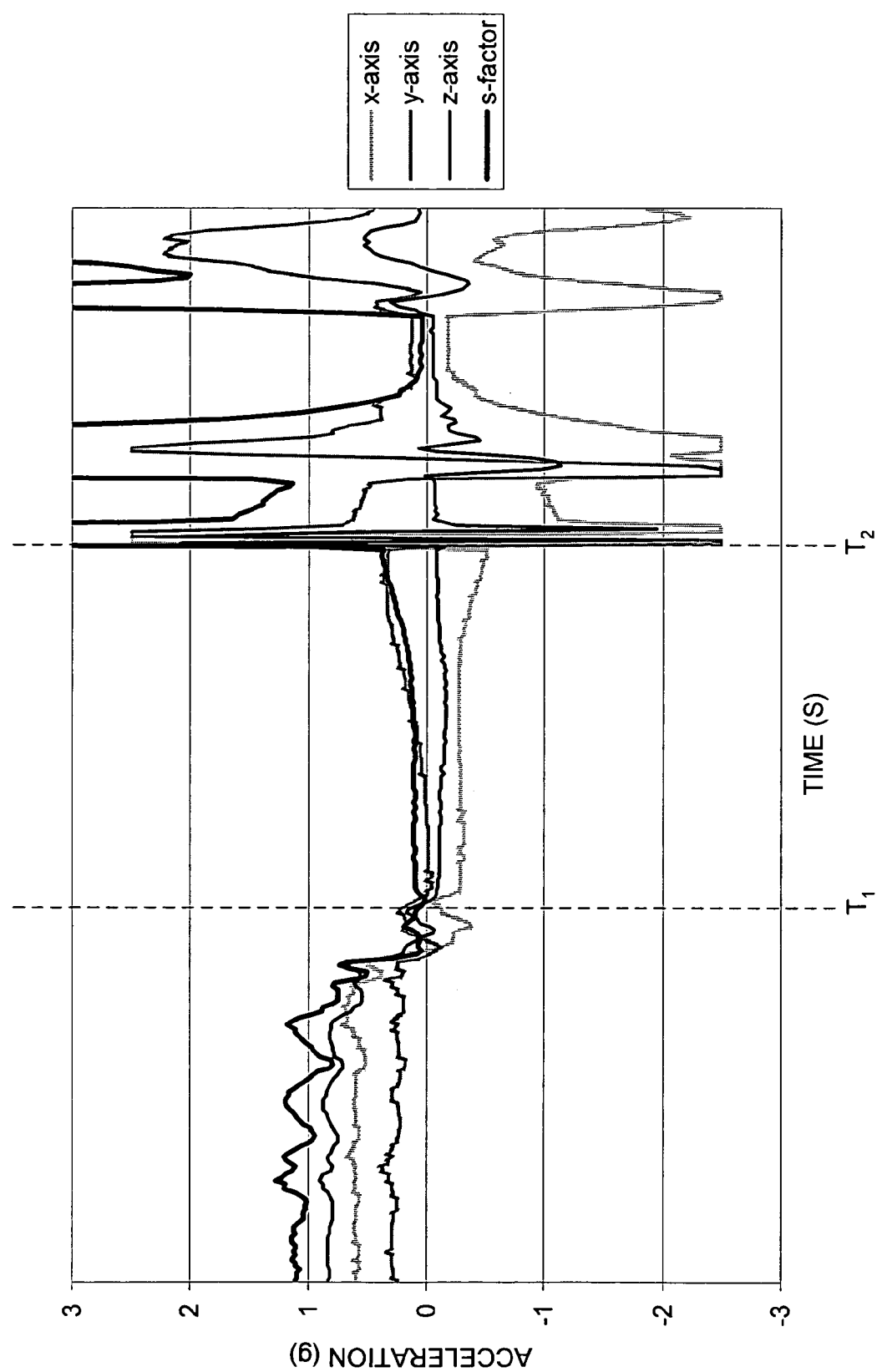
FIG. 6 is a graph of exemplary acceleration measurements during non-linear fall conditions in accordance with an embodiment of the invention.

Turning now to FIG. 6, a graph 600 illustrates exemplary accelerometer measurement signals x, y, z and the resulting $S_{factor}$ taken over a time period that includes a first non-linear fall. Specifically, the graph 600 illustrates a rotational fall condition that occurs at time $T_1$. As illustrated in graph 600, at time $T_1$ the $S_{factor}$ values go to within a value range of zero g. Furthermore, the $S_{factor}$ values at $T_1$ become smooth, as illustrated by the relatively low rates of change in the $S_{factor}$ during this time. Thus, a non-linear fall condition is detected responsive to the signals x, y and z beginning at time $T_1$. At time $T_2$, the $S_{factor}$ leaves the value range, thus indicating the resulting impact. The amount of time between $T_1$ and $T_2$ is the approximate fall time. Again, the fall time can be used to calculate the fall distance.

As was described above, in addition to detecting a non-linear fall, the system and method can be used to determine if the non-linear fall was initiated or accompanied with external force. To determine if the fall was initiated by external force, the previously sampled data points that were read before the fall are analyzed to determine if the device experienced high accelerations in one direction.

Figure 7:
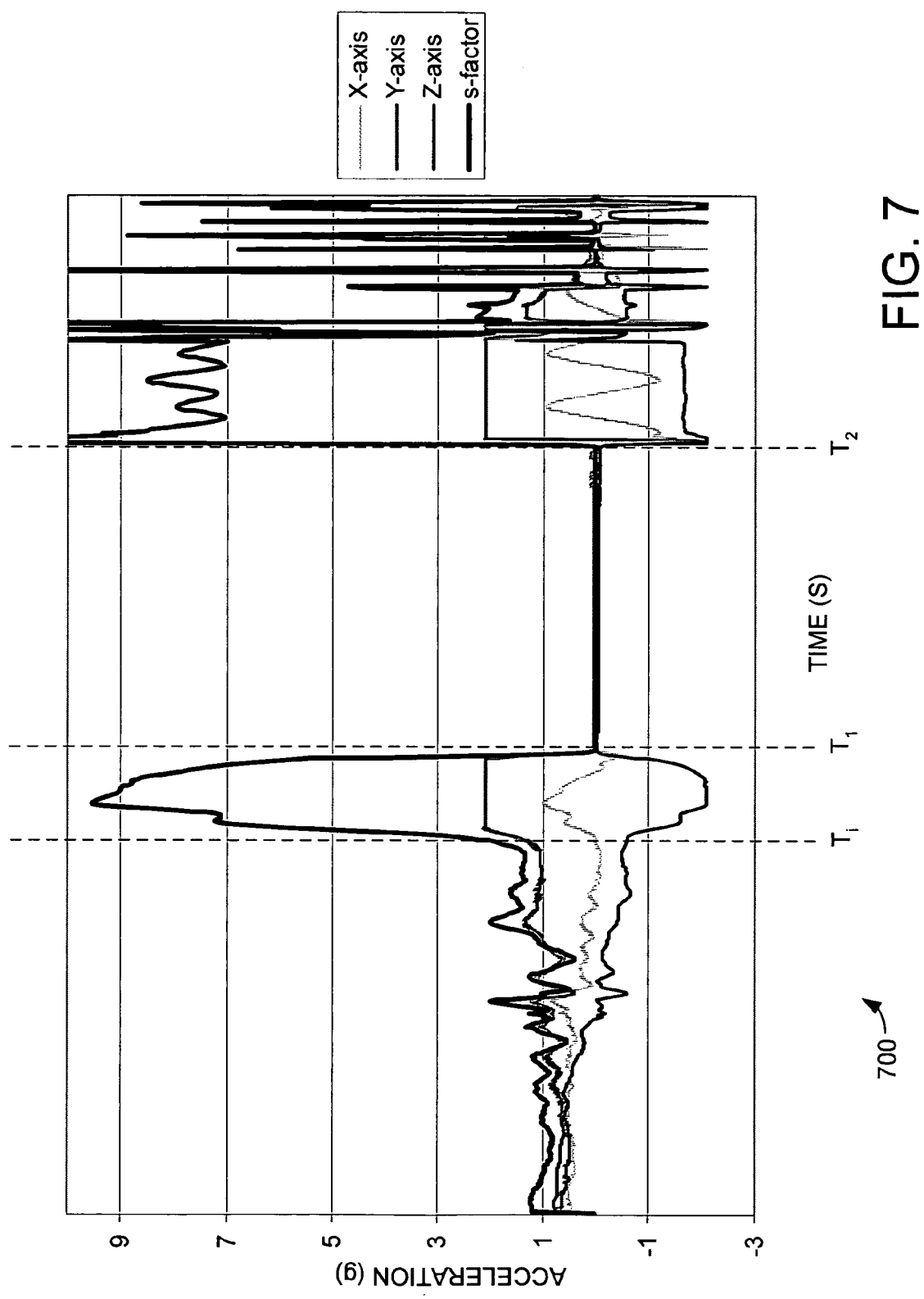
FIG. 7 is a graph of exemplary acceleration measurements during non-linear fall conditions with external force in accordance with an embodiment of the invention.

Turning now to FIG. 7, a graph 700 illustrates exemplary receive accelerometer measurement signals x, y, z and the resulting $S_{factor}$ taken over a time period that includes a second non-linear fall. Specifically, the graph 700 illustrates a projectile fall condition that occurs at time $T_1$. As illustrated in graph 700, at time $T_1$ the $S_{factor}$ values go to within a value range of zero g. Furthermore, the $S_{factor}$ values at $T_1$ become smooth, as illustrated by the relatively low rates of change in the $S_{factor}$. Thus, a non-linear fall condition is detected responsive to the signals x, y and z beginning at time $T_1$. At time $T_2$, the $S_{factor}$ leaves the value range, thus indicating the resulting impact. The amount of time between $T_1$ and $T_2$ is the approximate fall time. Again, the fall time can be used to calculate the fall distance.

Furthermore, graph 700 illustrates that the fall was initiated by additional external force. Specifically, beginning at time $T_i$ the acceleration measurements begin to greatly diverge from the zero g. This results in a large increase in the $S_{factor}$ that continues until time $T_1$. Thus, the time from $T_i$ to $T_1$ corresponds to the time the device was subjected to external force (e.g., was being thrown). At time $T_1$ the device is released and a fall occurs. Thus, by the examining the data before the fall (e.g., before $T_1$) it can be determined that the device was subjected to significant external force prior to the fall. Specifically, by determining if the $S_{factor}$ was above a relatively high threshold amount in a predetermined time period prior to the fall it can be determined if the fall was accompanied with external force. Likewise, if the $S_{factor}$ was instead close to 1 prior to the fall then the object was static or moving slightly prior to the fall.

The fall detection system can be implemented with a variety of different types and configurations of devices. As discussed above, the system is implemented with a processor that performs the computation and control functions of the fall detector. The processor may comprise any suitable type of processing device, including single integrated circuits such as a microprocessor, or combinations of devices working in cooperation to accomplish the functions of a processing unit. In addition, the processor may part of the electronic device's core system, or a device separate to the core system. Furthermore, it should be noted that in some cases it will be desirable to integrate the processor functions with the accelerometers. For example, a suitable state machine or other control circuitry integrated with the accelerometers can implement the plurality of accelerometers and the processor in a single device solution. In such a system circuitry can be used to directly determine if the accelerometer plates are close to a zero position, and provide the warning to the device.

The processor can comprise special purpose hardware configured for fault detection. Alternatively, the processor can comprise a programmable processor that executes programs stored in a suitable memory, with the programs configured to provide fault detection. Thus, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks, and transmission media such as digital and analog communication links, including wireless communication links.

The present invention thus provides a system and method for fall detection in an electronic device. The system and method provides the ability to reliably detect falls even in the presence of other motion in the electronic device. The fall detection system includes a plurality of accelerometers and a processor. The plurality of accelerometers provides acceleration measurements to the processor, with these measurements describing the current acceleration of the electronic device in all directions. The processor receives the acceleration measurements and compares the acceleration measurements to a value range to determine if the device is currently falling. Furthermore, the system and method can reliably detect a non-linear fall, such as when the fall is accompanied with device rotation or initiated by additional external force. To detect a non-linear fall, the processor compares combinations of acceleration measurements to a value range and further determines the smoothness of the acceleration measurement combinations. If the acceleration measurement combinations are within the value range and are smooth, then a non-linear fall is occurring.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A system for determining if an electronic device is falling, the system comprising:
   a plurality of accelerometers, the plurality of accelerometers adapted to measure electronic device acceleration in a plurality of directions and produce a plurality of acceleration measurements; and
   a processor, the processor adapted to receive the plurality of acceleration measurements from the plurality of accelerometers and compare the plurality of acceleration measurements to a value range, and wherein the processor is adapted to determine a fall is occurring if the plurality of acceleration measurements are within the value range, and wherein the processor is further adapted to determine if a non-linear fall is occurring by calculating a combination of the plurality of acceleration measurements and determining a rate of change of the combination of the plurality of acceleration measurements.

2. The system of claim 1 wherein the processor further determines a fall is occurring if the plurality of acceleration measurements are within the value range for a predetermined number of consecutive acceleration measurements.

3. The system of claim 2 wherein the predetermined number of consecutive acceleration measurements comprises 10 consecutive acceleration measurements.

4. The system of claim 1 wherein the processor determines a rate of change of the combination of the plurality of acceleration measurements determining if a selected number of consecutive combinations of the plurality of acceleration measurements each has a change less than a threshold delta value.

5. The system of claim 1 wherein the plurality of accelerometers comprise a first accelerometer providing a first acceleration measurement x, a second accelerometer providing a second acceleration measurement y, and a third accelerometer providing a third acceleration measurement z, and wherein the combination of the plurality of acceleration measurements comprises $x^2+y^2+z^2$.

6. The system of claim 1 wherein the plurality of accelerometers comprise micro machined accelerometers.

7. The system of claim 1 wherein the plurality of accelerometers comprise a first accelerometer measuring acceleration in a X direction, a second accelerometer measuring acceleration in a Y direction, and a third accelerometer measuring acceleration in a Z direction, where X, Y and Z are perpendicular to each other.

8. The system of claim 1 wherein the processor further determines if a detected fall was accompanied by external force by determining if the combination of the acceleration measurements exceeded a threshold value in a time period prior to the detected fall.

9. A system for determining if an electronic device is falling, the system comprising:

a first accelerometer providing a first acceleration measurements x;
a second accelerometer providing a second acceleration measurements y;
a third accelerometer providing a third acceleration measurements z;
a processor, the processor receiving the first acceleration measurements x, the second acceleration measurements y, and the third acceleration measurements z; the processor comparing the first acceleration measurements x, the second acceleration measurements y, and the third acceleration measurements z to a value range, and wherein the processor determines a fall is occurring if the first acceleration measurements x, the second acceleration measurements y, and the third acceleration measurements z are each within the value range for a first selected number of measurement samples, and wherein the processor further determines if a fall with rotation is occurring if $x^2+y^2+z^2$ is within a second value range and has a rate of change determined as an amount of change less than a threshold delta value for a second selected number of measurement samples.

10. The system of claim 9 wherein the process further determines if a detected fall was accompanied by external force by determining if the combination of $x^2+y^2+z^2$ values exceeded a threshold value in a time period prior to the detected fall.

11. A method for determining if an electronic device is falling, the method comprising the steps of:
measuring electronic device acceleration in a plurality of directions and producing a plurality of acceleration measurements;
comparing the plurality of acceleration measurements to a value range to determine if the plurality of acceleration measurements are within the value range;
determining if a fall with rotation is occurring by calculating a combination of the plurality of acceleration measurements and determining a rate of change of the combination of the plurality of acceleration measurements; and
notifying the electronic device responsive to a determined fall with rotation.

12. The method of claim 11 wherein the step of comparing the plurality of acceleration measurements to a value range comprises comparing a predetermined number of consecutive acceleration measurements.

13. The method of claim 12 wherein the predetermined number of consecutive acceleration measurements comprises 10 consecutive acceleration measurements.

14. The method of claim 11 wherein the step of determining if a fall with rotation is occurring by calculating a combination of the plurality of acceleration measurements and determining a rate of change of the combination of the plurality of acceleration measurements comprises determining if a selected number of consecutive combinations of the plurality of acceleration measurements each has a change less than a threshold delta value.

15. The method of claim 11 wherein the plurality acceleration measurement comprises a first acceleration measurement x, a second acceleration measurement y, and a third acceleration measurement z, and wherein the combination of the plurality of acceleration measurements comprises $x^2+y^2+z^2$.

16. The method of claim 11 wherein the plurality acceleration measurements are received from a plurality of accelerometers comprise micro machined accelerometers.

17. The method of claim 11 wherein the plurality acceleration measurements are received from the plurality of accelerometers that comprise a first accelerometer measuring acceleration in a X direction, a second accelerometer measuring acceleration in a Y direction, and a third accelerometer measuring acceleration in a Z direction, where X, Y and Z are perpendicular to each other.

18. The method of claim 11 further comprising the step of determining if a detected fall was accompanied by external force by determining if the combination of the acceleration measurements exceeded a threshold value in a time period prior to the detected fall.

19. A method for determining if an electronic device is falling, the method comprising the steps of:
measuring first acceleration measurements x;
measuring second acceleration measurements y;
measuring third acceleration measurements z;
comparing the first acceleration measurements x, the second acceleration measurements y, and the third acceleration measurements z to a value range, wherein a fall is determined to be occurring if the first acceleration measurements x, the second acceleration measurements y, and the third acceleration measurements z are each within the value range for a first selected number of measurements;
combining the first acceleration measurements x, the second acceleration measurements y, and the third acceleration measurements z into a combination of $x^2+y^2+z^2$ values;
comparing the combination of $x^2+y^2+z^2$ values to a second value range, and determining if the combination of $x^2+y^2+z^2$ values has a rate of change determined as an amount of change less than a threshold delta value for a second selected number of measurements; and
notifying the electronic device responsive to the combination of $x^2+y^2+z^2$ values having a rate of change determined as an amount of change less than a threshold delta value for a second selected number of measurements.

20. The method of claim 19 further comprising the step of determining if a detected fall was accompanied by external force by determining if the combination of $x^2+y^2+z^2$ values exceeded a threshold value in a time period prior to the detected fall.

* * * * *